(12) United States Patent
Franck

(10) Patent No.: US 11,171,543 B2
(45) Date of Patent: Nov. 9, 2021

(54) ENERGY GENERATION FROM A DOUBLE WELLBORE

(71) Applicant: Jan Franck, Weidenberg (DE)

(72) Inventor: Jan Franck, Weidenberg (DE)

( * ) Notice: Subject to any disclaimer, the term of this patent is extended or adjusted under 35 U.S.C. 154(b) by 0 days.

(21) Appl. No.: 16/505,123

(22) Filed: Jul. 8, 2019

(65) Prior Publication Data

US 2019/0334412 A1 Oct. 31, 2019

Related U.S. Application Data

(63) Continuation-in-part of application No. 15/504,579, filed as application No. PCT/IB2015/001386 on Aug. 18, 2015, now abandoned.

(30) Foreign Application Priority Data

Aug. 18, 2014 (DE) .................... 10 2014 012 047.3

(51) Int. Cl.
| | |
|---|---|
| *H02K 7/18* | (2006.01) |
| *F03B 13/00* | (2006.01) |
| *E21B 43/30* | (2006.01) |
| *E21B 33/138* | (2006.01) |
| *H02K 19/36* | (2006.01) |

(Continued)

(52) U.S. Cl.
CPC ......... *H02K 7/1823* (2013.01); *E21B 33/138* (2013.01); *E21B 43/30* (2013.01); *F03B 13/00* (2013.01); *H02K 11/0094* (2013.01); *H02K 19/365* (2013.01); *E21B 47/04* (2013.01); *F05B 2210/11* (2013.01); *F05B 2220/32* (2013.01); *F05B 2260/42* (2013.01)

(58) Field of Classification Search
CPC .......... E21B 33/10; E21B 43/30; F03B 13/00; F03B 13/08; F03B 13/086; H02K 7/1823; Y02E 10/22; Y02E 60/17
USPC .......................................................... 290/54
See application file for complete search history.

(56) References Cited

U.S. PATENT DOCUMENTS

| 1,809,496 A * | 6/1931 | Suess .................... F03B 13/086 |
|---|---|---|
| | | 415/30 |
| 2,962,599 A | 11/1960 | Pirkey |

(Continued)

FOREIGN PATENT DOCUMENTS

| DE | 117466 | 2/1900 |
|---|---|---|
| EP | 0212692 | 3/1987 |

(Continued)

*Primary Examiner* — Charles Reid, Jr.
(74) *Attorney, Agent, or Firm* — Pandiscio & Pandiscio

(57) ABSTRACT

A device for utilizing groundwater, characterized by an upper well shaft and an upper well water reservoir having a first water level; a lower well shaft and a lower well water reservoir having a second water level; wherein the second water level is lower than the first water level; a water line between the upper well water reservoir and the lower well water reservoir including a first line extending downwardly inside the well shaft of the upper well and into the upper well water reservoir, a second line extending downwardly inside the well shaft of the lower well and into the lower well water reservoir, and a connecting line connecting the first branch line and the second branch line; at least one turbine coupled to the water line; and an electrical generator coupled to the at least one turbine for delivering electric power to the power grid.

27 Claims, 4 Drawing Sheets

(51) Int. Cl.
*H02K 11/00* (2016.01)
*E21B 47/04* (2012.01)

(56) References Cited

U.S. PATENT DOCUMENTS

| | | | | |
|---|---|---|---|---|
| 4,134,024 | A | * | 1/1979 | Wiseman ................ E21B 36/04 |
| | | | | 166/65.1 |
| 4,180,976 | A | * | 1/1980 | Bunn .................... F03B 13/086 |
| | | | | 137/123 |
| 4,364,228 | A | | 12/1982 | Eller |
| 4,369,373 | A | * | 1/1983 | Wiseman ................ E21B 36/04 |
| | | | | 290/2 |
| 4,490,232 | A | * | 12/1984 | Lapeyre .................... C25B 1/04 |
| | | | | 203/10 |
| 5,706,892 | A | | 1/1998 | Aeschbacher, Jr. et al. |
| 7,003,955 | B2 | | 2/2006 | Davis |
| 7,224,080 | B2 | * | 5/2007 | Smedstad ................. F03G 7/05 |
| | | | | 290/43 |
| 2002/0180215 | A1 | | 12/2002 | Mitchell |
| 2009/0085353 | A1 | | 4/2009 | Riley |
| 2009/0121481 | A1 | | 5/2009 | Riley |
| 2009/0126923 | A1 | * | 5/2009 | Montgomery .......... F01K 25/10 |
| | | | | 166/57 |
| 2011/0140435 | A1 | | 6/2011 | Miller |
| 2011/0233937 | A1 | | 9/2011 | Riley |
| 2014/0197640 | A1 | | 7/2014 | Barakat |
| 2014/0246860 | A1 | | 9/2014 | Payre et al. |

FOREIGN PATENT DOCUMENTS

| | | |
|---|---|---|
| FR | 816064 | 7/1937 |
| JP | 09177654 | 7/1997 |

\* cited by examiner

ENERGY GENERATION FROM A DOUBLE WELLBORE

REFERENCE TO PENDING PRIOR PATENT APPLICATIONS

This patent application is a continuation-in-part of prior U.S. patent application Ser. No. 15/504,579, filed Feb. 16, 2017 by Jan Franck for ENERGY GENERATION FROM A DOUBLE WELLBORE, which patent application in turn claims benefit of International (PCT) Patent Application No. PCT/IB2015/001386, filed Aug. 18, 2015 by Jan Franck for ENERGY GENERATION FROM A DOUBLE WELLBORE, which claims benefit of German Patent Application No. DE 10 2014 012 047.3, filed Aug. 18, 2014.

The three (3) above-identified patent applications are hereby incorporated herein by reference.

FIELD OF THE INVENTION

The present invention is directed to a device and a method for utilizing energy from groundwater.

BACKGROUND OF THE INVENTION

Due to the fact that fossil fuels are gradually running out, alternative fuels are necessary to be able to meet the increasing energy demands by a continually growing global population, now and in the future. Primarily solar power plants, wind power plants, and hydroelectric power plants are presently available for this purpose. Further technologies include utilization of geothermal energy, in addition to generation of biodiesel as well as sewage gas and biogas. However, all of these technologies still have various drawbacks: Solar energy depends on the length of the day and the solar angle of incidence, as well as the degree of cloud cover due to weather conditions; wind energy is likewise dependent on the weather. Hydroelectric power plants are most able to generate power in a relatively uniform manner, but they usually hinder ship navigation. Geothermal energy is directly available only at a few locations on the earth's surface; at other locations it requires extremely deep drilling, sometimes to 1,000 m or deeper. Biodiesel is obtained from the cultivation of rapeseed or other oleaginous plants, which requires enormous areas of agricultural land, so that grain cultivation is limited to food production. To a great extent, plant components from agriculture are used for biogas as well, whereas other components such as liquid manure generally represent only a minor component. Sewage sludge is generated in urban centers, but is highly toxic and therefore requires intensive treatment. The gas that can thus be generated results from organic components of wastewater, and therefore is not available in any desired amount.

SUMMARY OF THE INVENTION

The drawbacks of the described prior art have resulted in the object of the invention, to provide a device and a method for developing further alternative energy sources.

This object is achieved by a) two wells whose shafts do not directly communicate with one another, and whose well water reservoirs are filled with water up to a well water level in each case, the two well water levels being at different elevations;

b) a connecting line between the well water reservoirs of the two wells;

c) at least one hydraulic motor or at least one pump that is operable as a generator inside the connecting line; and d) an electrical generator that is mechanically coupled to the at least one hydraulic motor or to the at least one pump that is operable as a generator.

A simple principle is implemented with such a device:

In two different wells, water is available in each case, but at different heights. If these two water reservoirs are connected by a line that is completely filled with water, the well water has the tendency to flow through the line from the well having the higher water level to the well having the lower water level. Use may be made of this force to drive a water wheel or the like, for example in a hydraulic motor or in a pump that is operable as a motor, which is connected into the connecting line between the two wells.

It has proven advantageous that the height difference of the well water levels of the two wells is 2 m or greater, for example 5 m or greater, preferably 10 m or greater. The greater the height difference, the higher the achievable energy output. However, the atmospheric pressure prevailing at ground level corresponds to the pressure of a water column of approximately 10.13 meters, so that greater height differences can be spanned only using special measures. Thus, for example, multiple intermediate water reservoirs, which preferably are exposed to atmospheric air pressure, could be situated one above the other along the connecting line, for example with a maximum height difference in each case of 10 meters or less, so that the overall height is divided into individual stages of 10 meters or less in each case.

In addition, it is expedient to use multiple hydraulic motors, or pumps that are operable as generators, that are situated in each case between such intermediate water reservoirs and/or at maximum vertical distances of 20 meters or less, preferably 15 meters or less.

The water output of the upper well should be less than or equal to the water absorption capacity of the deeper well, so that the deeper well can never fill up.

The bottoms of the two wells are preferably drilled to different depths above sea level.

The height difference between the well bottoms may be 2 m or greater, for example 5 m or greater, preferably 10 m or greater, in particular 20 m or greater, or even 50 m or greater. It is not so much the height of the well bottoms, but, rather, primarily the levels of the water level in the two wells that are determining for the pressure conditions.

The two wells may also be situated concentrically with respect to one another, the deeper well preferably being annularly surrounded by the higher well and being separated from same by a ring-shaped seal. Unwanted overflow between the two wells should be reliably eliminated in order not to reduce the water output of the upper well or the absorption capacity of the lower well, and instead to maximize the efficiency of the system.

On the other hand, there is also the option of offsetting the two wells with respect to one another in the horizontal direction. The wells may on the one hand be situated immediately adjacent to one another when different groundwater levels are drilled; on the other hand, if the same groundwater aquifers are to be drilled, it is recommended that the two bores be introduced at different locations on a slope or some other fault, between which the height profile of the groundwater pressure surface changes.

According to a preferred design rule, the groundwater pressure surface of the upper well is above the elevation of the groundwater pressure surface of the lower well. In the stationary state, i.e., in particular without energy production or water extraction, these groundwater pressure surfaces determine the heights of the well levels in the two wells.

The invention may be implemented in that the two wells are offset with respect to one another in the horizontal direction, and that the higher groundwater pressure surface at the upper wellbore merges, via an inclined progression, into the lower groundwater pressure surface at the lower wellbore.

Another embodiment of the invention is characterized in that the groundwater pressure surfaces at the upper wellbore and at the lower wellbore do not merge into one another, but instead are part of different groundwater levels that are separated from one another by at least one water-impermeable layer.

It is recommended in the invention that a water-impermeable layer of soil or rock is sealed off between two different drilled groundwater levels to avoid direct overflow between various groundwater levels.

The shaft of a wellbore that extends into a deeper groundwater level should be sealed off from the outside at the level of higher groundwater levels in order to avoid runoff of the groundwater that flows between the wellbores into an upper groundwater level, and/or to prevent groundwater from an upper groundwater level from directly entering the shaft of the lower well.

Further advantages result from the fact that at least one shaft of a wellbore is jacketed, in part or preferably down to the well water reservoir of the wellbore, preferably by a water-tight jacket. A jacket may on the one hand keep the rock surrounding the well shaft from falling into the well shaft, and on the other hand, for precise flow conditions, may in particular ensure that no flow bypass exists next to the connecting line between the two wells. In this regard, it should be mentioned that the connecting line does not have to be laid inside the two wells, which naturally involves the least design effort, but instead could be laid next to the wells, in particular in the ground itself or in a small bore parallel to the well shaft. However, such a technically possible embodiment is not necessarily to be recommended, since the connecting line is therefore not accessible for modification purposes. In contrast, if the cross section of the well shafts is dimensioned in such a way that a person can climb in the well shafts, work on the connecting line is possible at any time. This is also facilitated by anchoring metal rungs one on top of the other in a ladder-like arrangement inside at least one well shaft at its inner side, or by fixing a ladder to the inner side of the well shaft.

The cross sections of the two wells may be different. The cross section of the upper well may be larger than, equal to, or smaller than the cross section of the deeper well. For concentric wells, the cross section of the upper well should be larger, and for adjacent parallel wells the [cross section of the] upper well may be smaller so that the lower well cannot fill up.

Drying up of the upper well may be detected when a sensor is provided in the area of the upper well and/or in the area of the connecting line between the well water reservoirs of the two wells, upstream from the hydraulic motor or from the pump that is operable as a generator.

If the upper well dries up, the water column in the connecting line is at risk of collapsing, so that a laborious, lengthy initiation sequence must first be reinstituted in order to refill the connecting line with water. To avoid this, a shutoff valve may be provided in the area of the connecting line between the well water reservoirs of the two wells, which may be closed when the upper well dries up in order to interrupt the flow inside the connecting line.

The invention is further characterized by a method for utilizing the groundwater, comprising the following steps:
drilling two adjacent wells deeply enough that their well water levels are at different elevations;
providing a connecting line between the well water reservoirs of the two wells;
connecting a hydraulic motor, or a pump that is operable as a generator, into the connecting line;
mechanically coupling an electrical generator to the hydraulic motor or to the pump that is operable as a generator.

A system according to the invention may be established with little effort in this way. It should be kept in mind that the well cross section does not have to be very large if the power that is thus generatable is to be consumed only locally, for example.

Further advantages are provided by a method, by means of a device comprising two wells whose well water levels are at different elevations, a connecting line between the well water reservoirs of the two wells, a hydraulic motor or a pump that is operable as a generator inside the connecting line, and an electrical generator that is mechanically coupled to the hydraulic motor or to the pump that is operable as a generator, for utilizing the groundwater, wherein
a) the connecting line is filled with water until the connecting line is completely filled with water;
b) after all valves in the connecting line are open, the differential pressure between the two well water reservoirs in the connecting line brings about a flow from the upper well to the deeper well, thus driving the hydraulic motor, or the pump that is operable as a generator;
c) power is generated in the electrical generator connected to the hydraulic motor, or to the pump that is operable as a generator, and is stored, locally consumed, or supplied to a power grid.

A system according to the invention may thus be put into operation at any time.

The connecting line may be filled with water from the top, for example with water from the public water system or with water that is conveyed upwardly from one of the two wells, in particular via a further line having a submersible pump. As the result of filling from the top, there is no risk of a pump that is operable as a generator running dry.

To avoid runoff of the water column from the connecting line during or after filling of the connecting line, it is recommended in the invention to temporarily close valves in the area of one or both well reservoirs, i.e., until the system starts up for the purpose of power generation.

In addition, in step a) for filling the connecting line, the electrical generator may be operated as a motor and the hydraulic motor may be operated as a pump, in such a way that water is drawn into the connecting line between the two wells until the connecting line is completely filled with water.

Lastly, according to the teaching of the invention, in step c) the electrical generator is operated as a generator in order to deliver electrical energy.

BRIEF DESCRIPTION OF THE DRAWINGS

Further features, particulars, advantages, and effects of the invention result from the following description of several preferred embodiments of the invention and with reference to the drawings, which show the following.

DETAILED DESCRIPTION OF THE PREFERRED EMBODIMENTS

Figure 1:
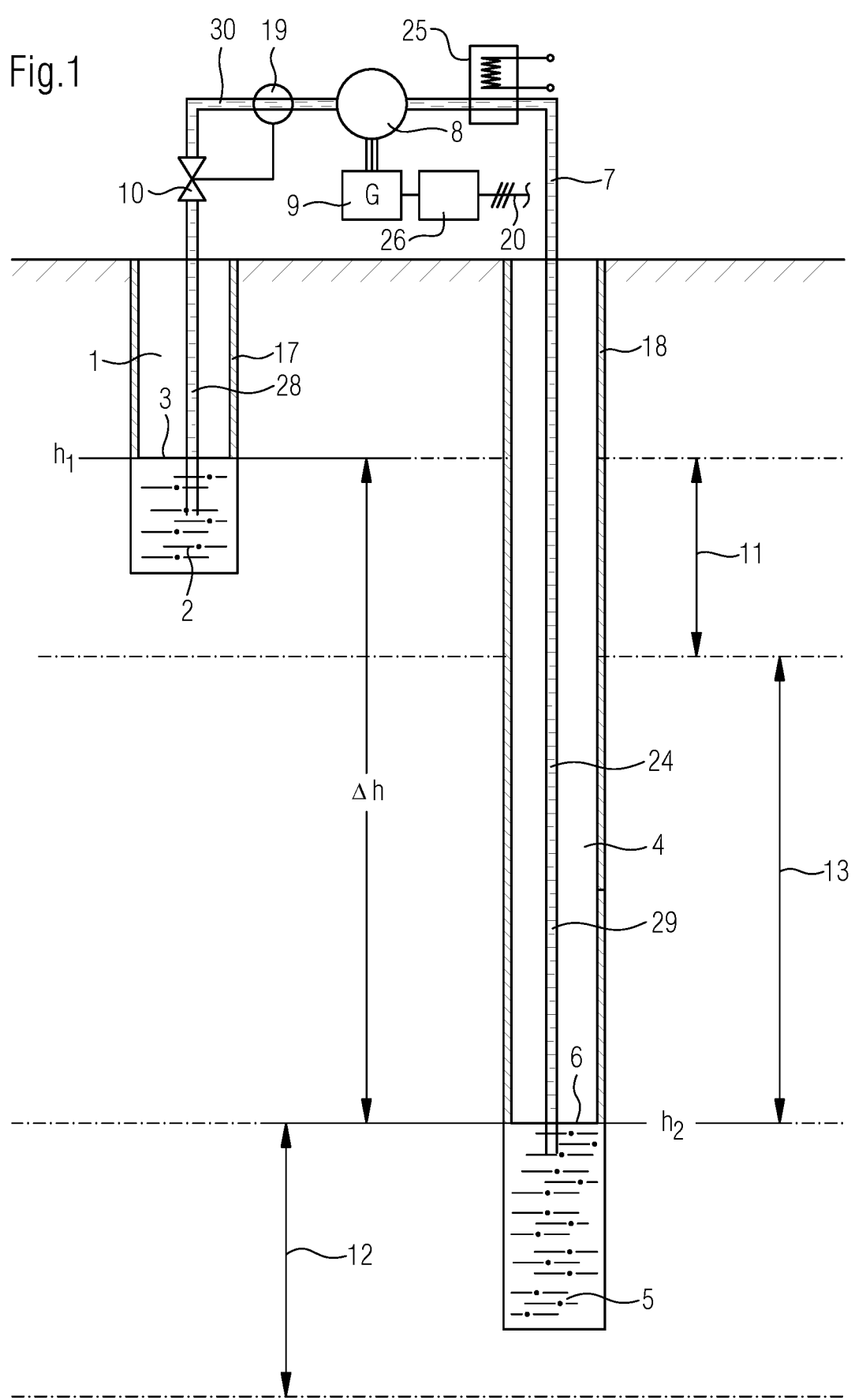
FIG. 1 shows an arrangement according to the invention for utilizing energy from groundwater, in a vertical section.

FIG. 1 shows, at the left, an upper well 1 having an upper well water reservoir 2 at a higher elevation, which is filled with well water up to an upper well level 3 at a height $h_1$ above sea level; and at the right shows a lower well 4 having a lower well water reservoir 5 at a lower elevation and containing well water up to a lower well level 6 at a height $h_2$ above sea level. The following applies:

$$h_1 > h_2,$$

where $h_1$ and $h_2$ are based on the same zero point, in particular normal zero (sea level). The height difference $\Delta h$ between the two well levels 3, 6 is $$\Delta h = h_1 - h_2.$$

In the following discussion, the upper well 1 having the higher well water level at the upper elevation $h_1$ is referred to as the "upper well," and the lower well 4 having the lower well water level at the lower elevation $h_2$ is referred to as the "lower well," although the top side of the well head of the two wells 1, 4 may be at the same elevation.

The upper well 1 and/or the lower well 4, has a well shaft which is vertical or predominately vertical. That means that the upper well 1 and/or the lower well 4 has a longitudinal shape where the longitudinal axis is vertical or predominantly vertical. In other words, the longitudinal axis of the upper well 1 and/or of the lower well 4 points to the center of the earth or defines an angle, together with the perpendicular, of 45° or less.

A water line 7 comprises a first branch line 28 inside the well shaft of the upper well, a second branch line 29 inside the well shaft of the lower well, and a connecting line 30 connecting the first branch line 28 and the second branch line 29, especially at their upper ends.

The connecting line 29 extends horizontally or predominantly horizontally and connects the branches in the upper well 1 and the lower well 4. The first branch 28 submerges into the upper well water reservoir 2, and the second branch 29 submerges into the lower well water reservoir 5 at that location. A turbine or a hydraulic motor, or a pump 8 operable as a motor is connected into the connecting line 7. The mechanical shaft of the motor or pump is connected to an electrical generator 9. The current generated at the output terminals of the motor or pump 8 may be either stored or locally consumed or, for example using a converter or inverter connected downstream, supplied to a preferably public power grid 20 by synchronizing the delivered voltage with the system voltage of the power grid 20. The power grid 20 may be an alternating current power grid 20 or a three-phase power grid 20. For this purpose, the amplitude and phase position of the current may be controlled or regulated in such a way that power flows into the preferably public power grid 20. For example, such a converter or inverter may be coupled to the power grid 20 via chokes or other, preferably inductive, reactors, and the output voltage of the converter or inverter is synchronous and in phase with the particular voltage of the power grid 20, but has a higher amplitude than the latter, so that a current is injected into the power grid 20 against the grid voltage.

Valves 10 or other fittings may also be introduced into the water line 7. By means of valves 10, the water flow may be interrupted in order to stop the process for maintenance purposes, for example. A check valve 10 may be used for avoiding backflow during suction intake of the water.

Further modifications are possible. Thus, for example, in addition to, or as an alternative to, the hydraulic motor or the pump 8, a heat exchanger may be connected into the connecting line 30 in order to withdraw additional thermal energy from the water and otherwise allow it to be utilized.

Of course, a portion of the water may also optionally be diverted for other purposes, for example supplied to the public water system or locally consumed.

To drill wells having different well water levels 3, 6, it is possible, as illustrated in FIG. 1, to drill a so-called first or upper groundwater aquifer 11 for the upper well 1, while the lower well 4, whose groundwater pressure surface is considerably beneath the groundwater pressure surface of the upper groundwater aquifer 11, extends to a lower groundwater aquifer 12. The invention thus makes use of the fact that, depending on the geological strata in the earth, so-called groundwater aquifers 11, 12 may alternate with water-impermeable layers 13, as indicated in FIG. 1. The water-impermeable layer 13 separates the two groundwater aquifers 11, 12 from one another and seals them off with respect to one another, so that in the normal case no appreciable overflow takes place. These are then referred to as so-called groundwater aquifers 11, 12. It is also possible to provide more than two such groundwater aquifers 11, 12 one on top of the other.

As is apparent in FIG. 1, the upper well 1 is contained by the upper groundwater aquifer 11, whereas the lower well 4 is contained by the more deeply situated, lower groundwater aquifer 12. As soon as the connecting line 30 is completely filled with water, a greater volume and weight of water are suspended in the branch of the connecting line 7, submerged in the lower well 4, than in the branch that is submerged in the upper well 1, and the greater weight sets a flow of water in motion from the upper well 1, from which the water is lifted out, toward the lower well 4, into which the water inside the connecting line 7 flows. This flow of water in turn puts the hydraulic motor 8 into operation, and the electrical generator 9 is then driven by the hydraulic motor.

For this mechanism, it is advantageous when the tapped upper groundwater aquifer 11 is as abundant as possible, and the likewise drilled, lower groundwater aquifer 12 is as absorptive as possible. In addition, a bypass between the two, i.e., a flow connection outside the drilled or used upper well 1 and lower well 4, should preferably be avoided.

It is primarily the lower well 4 that is critical, since this well itself passes through the water-impermeable layer 13. During drilling of the lower well 4, it must therefore be ensured that no flow channel remains outside the lower well wall. It may be necessary to annularly seal off this area at at least one location, for example by pressing in a hydraulically curable compound, for example.

In addition, the wall of the lower well 4 should preferably be water-tight in the area of the upper groundwater aquifer 11, so that water infiltrating at that location does not result in a bypass through the lower well 4. That can be achieved by a water-tight jacket 18 at least in this area. This water-tight jacket shall not extend into the regarding well water reservoir so that water can be exchanged with the surrounding earth. At least the lower well 4 should therefore be lined at its shaft wall, for example by a recessed pipe made of metal, for example, or by superposed rings made of concrete, for example. In any case, however, it should be ensured that at the joints between two adjoining elements of the inner well lining in the area of the wall of the well shaft, a seal is provided, for example by means of an elastic, ring-shaped sealing element, or by adhesive bonding, filling, or the like.

In the illustrated embodiment, the turbine 8 and the electrical generator 9 are situated at ground level, for example in a machine room at that location. Although this is the simplest variant, since besides the well drilling itself no further excavation operations are necessary, it would also be possible to situate these elements 8, 9 in an underground cavern, which could be present, for example, at approximately the height of the well level 3 in the upper well 1, preferably approximately between the two well shafts. In such a case, the vertical extension of the branch of the connecting line 30 inside the lower well 4 may be minimized to approximately the height difference $\Delta h = h_1 - h_2$.

In this case, the horizontal connection line 30 can be arranged within a tunnel between both well bores or well shafts 1, 4.

Another special feature is that the liquid in the branch line 29 of the water line 7, which opens into the lower well 4, is "suspended" at the turbine or hydraulic motor 8, i.e., is held in equilibrium only by the external air pressure acting on the lower well level 6. However, the atmospheric air pressure at ground level is able to keep a water column suspended only to a maximum height of 10.13 meters. Therefore, the (lowest) hydraulic motor 8 should be installed at most approximately 10 meters above the lower well level 6, since otherwise, the water column in this branch could collapse with formation of a vacuum bubble, which naturally would soon fill with water vapor.

In order to allow the atmospheric pressure to act on the upper well level 3 and/or on the lower well level 6, besides the respective branch lines 28, 29, the outer cross-section of each branch line 28, 29 should be substantially smaller than the inner cross-section of the respective well shafts 1, 4, even if it is cladded with a water-tight jacket 17, 18. Preferably, the branch lines 28, 29 have no areal contact with the inner side of the respective well shafts 1, 4 and even no areal contact with the inner side of the respective water-tight jackets 17, 18. The branch lines 28, 29 can be held in place by some distance bodies centering a branch line 28, 29 within the respective well shafts 1, 4 or water-tight jackets 17, 18.

A further advantage of the invention is that there are no electric cables running inside of a well shaft 1, 4, which is an important measure of accident prevention, especially in comparison to embodiments with submerged turbines which have to be placed deep inside of a wellbore so that the current has to be fed out via electric cables.

On the other hand, since the water column above a turbine or hydraulic motor 8 exerts load on the turbine or hydraulic motor just to drive it, this portion of the water column cannot collapse. For deeper wells, it is therefore possible that the turbine or hydraulic motor 8 be installed at a preferably deep location, for example deep in the shaft of the lower well 4, or next to same in a machine room in a cavern, although such embodiment is not recommended in view of accident prevention.

When the water line 7 is filled from the top during start-up of the device, there is no risk at any time of the water column collapsing.

A better solution for greater depths is to provide at least an intermediate water reservoir 14 under atmospheric air pressure, for example at one-half the height, which on the one hand for the upper well 1 is used as a virtual lower well, and on the other hand for the lower well 4 is used as a virtual upper well. In such cases, two water lines $7a''$, $7b''$ would need to be provided, one between the upper well 1 and the intermediate water reservoir 14, and the other between the intermediate water reservoir 14 and the lower well 4, with one hydraulic motor $8a''$, $8b''$ in each line $7a''$, $7b''$. The electrical power of the electrical generators $9a''$, $9b''$ coupled thereto is then added when supplied to the power grid 20. If necessary, i.e., if $\Delta h = h_1 - h_2 > 2*10.13$ m applies, in this variant multiple intermediate water reservoirs 14 could also be provided at different heights, as well as a respective number of water line stages between such intermediate water reservoirs 14.

Multiple groundwater aquifers 11, 12 which can be tapped or drilled are not always present in the earth. As is apparent from FIG. 2, in such cases it is also conceivable to drill the upper well 1', and the lower well 4' at different locations in the earth, between which the groundwater pressure surface changes, for example at a slope 16 or in the area of a fault or the like. Although upper well 1', and the lower well 4' are now submerged in the same groundwater aquifer 11', as a result of the groundwater pressure surface dropping from the upper well 1' to the lower well 4', there is still a height difference $\Delta h = h_1 - h_2$ between the well levels 3', 6' in the upper well 1', and the lower well 4', which in turn is able to drive a flow of water inside the connecting line 30 from the upper well 1' to the lower well 4', and thus set the hydraulic motor 8' in operation, whereupon power is generated in the electrical generator 9', which may be used in the same way as in the variant according to FIG. 1.

Figure 4:
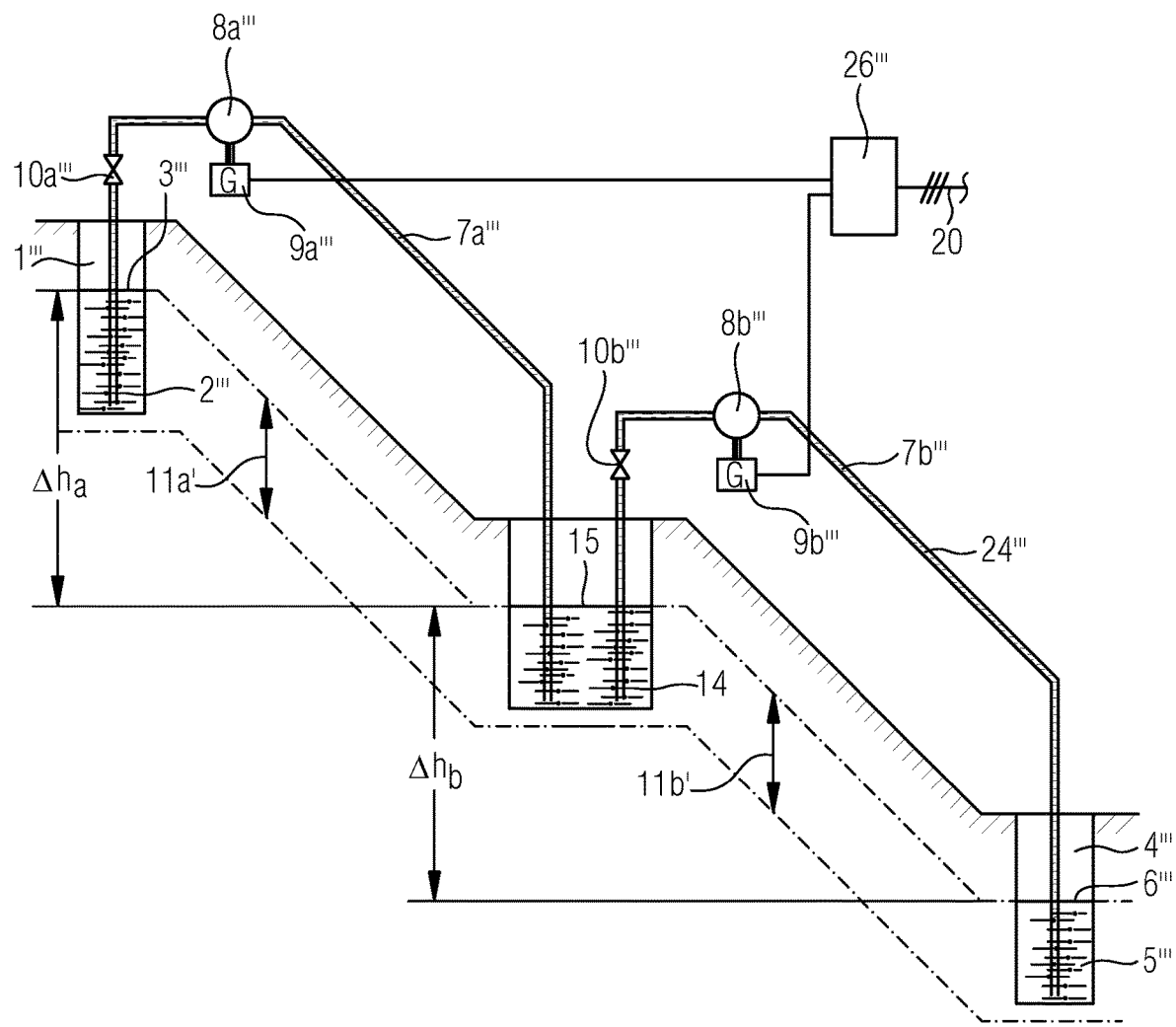
FIG. 4 shows another modified arrangement for utilizing energy from groundwater, in an illustration corresponding to FIG. 2.

The measures, described in the embodiment according to FIG. 1, for spanning greater height differences $\Delta h = h_1 - h_2 > 10.13$ m, on the one hand by installing the hydraulic motor 8 at a deeper location in the earth, just above the lower well level 6', and/or on the other hand by installing intermediate reservoirs at heights between the two well levels 3', 6', are also possible, as can be seen in the embodiment according to FIG. 4.

According to FIG. 1, the electric output terminals of the generator 9 can be coupled to the power grid 20 via an inverter or converter 26 which generates a two- or three-phase output signal at its electric output terminals from a different input from the generator output terminals.

In FIG. 1, another feature of the present invention can be seen, namely a heat exchanger 25 coupled to the water line 7, especially to the horizontal connection line 30, either upstream of the turbine 8 or downstream of the turbine 8. By this heat exchanger 25, heat can be gathered from the water in the water line 7 before sending it into well shaft 4. Such heat can be used for heating a building or for generating electrical current. On the other hand, if necessary, heat can be passed into the water before sending it back into the earth via well shaft 4.

Figure 2:
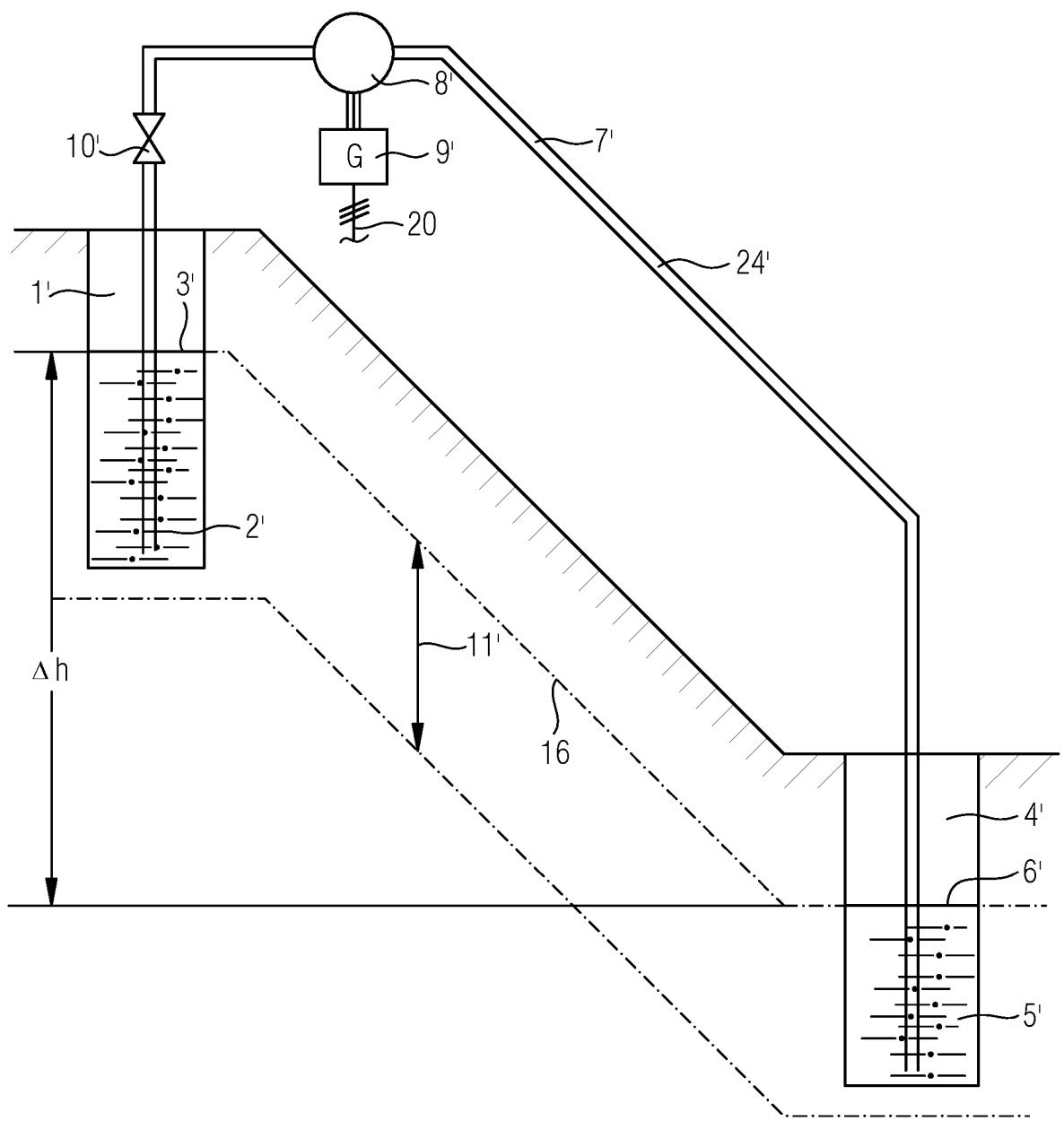
FIG. 2 shows a modified arrangement for utilizing energy from groundwater, in an illustration corresponding to FIG. 1.

The embodiment according to FIG. 2 even has the advantage that the groundwater in the shared groundwater aquifer 11' may once again reach the elevation in the area of the upper well 1' under the influence of capillary forces, so that a cyclic process is created which allows continuous operation over an unlimited time period.

In FIG. 2, it is shown that in some cases the generator 9 can be directly coupled to a power grid 20, without an inverter or converter 26. Such circuit is possible for all other embodiments, too.

Figure 3:
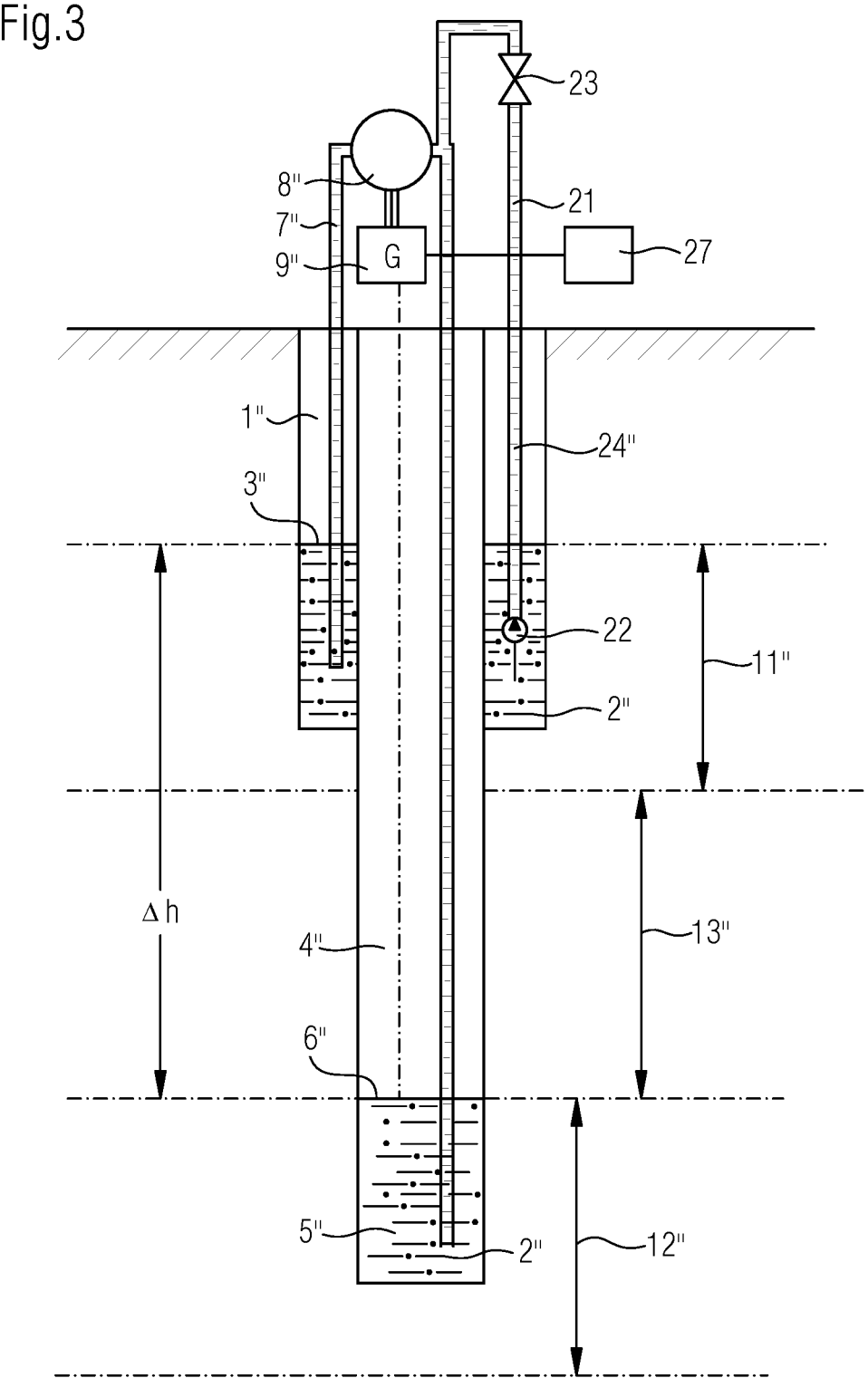
FIG. 3 shows another modified arrangement for utilizing energy from groundwater, in an illustration corresponding to FIG. 1.

A modification of the invention is shown in FIG. 3. Here, a geological formation having multiple groundwater aquifers 11", 12", separated from one another by a water-impermeable layer 13", is present.

As a result, the upper well 1", and the lower well 4" may be drilled close to one another, or, as is apparent in FIG. 3, concentrically with respect to one another.

Thus, for example, drilling for the upper well 1" is carried out with a larger or thicker drill than for the lower well 4". This may take place, for example, by changing the drill at the level of the bottom of the upper well 1", and continuing drilling with a smaller drill head until the bottom of the lower well 4" is reached.

The lining of the lower well 4" protrudes from below into the upper well 1", and at that location separates the outer ring-shaped upper well water reservoir 2" of the upper well 1" from the shaft of the lower well 4" situated inside same.

The branch of the water line 7 that is submerged in the lower well water reservoir 5" extends inside the lining of the lower well 4", which protrudes from below into the upper well 1", and the other branch, which is submerged in the upper well water reservoir 2", extends within the annular space outside the lining of the lower well 4" which protrudes from below into the upper well 1". Here as well, it must be ensured that a bypass does not result between the various groundwater aquifers 11", 12" due to leaks.

Since overall, only a single drilling is necessary here, the level of effort and also possibly the space requirements may be minimized, so that the arrangement according to FIG. 3 is also possible on small plots of land.

In FIG. 3, it can be seen that the generator 9" is coupled to an energy storage 27. Such energy storage 27 may comprise batteries, or one or more accumulators, or an electrolyse device which produces $H_2$ from $H_2O$ via a current.

In FIG. 4, an intermediate water reservoir 14 with an intermediate water level 15 between the upper well level 3'" and the lower well level 6'" is disclosed.

In such an embodiment, several embodiments according to the invention may be cascaded one after the other. Each stage comprises an own water line 7a'", 7b'" with an own turbine 8a'", 8b'" and an own generator 9a'", 9b'".

Each generator 9a'", 9b'" can be coupled to a power grid independently. On the other hand, the output voltages of the generators 9a'", 9b'" can be added by connecting them in a row, or the output currents of the generators 9a'", 9b'" can be added by connecting them in parallel. The resulting voltage or current can be fed to a common inverter or converter 26'", whose electric output terminals are coupled to the power grid 20. This latter embodiment has the advantage that only a single inverter or converter 26'" is needed, which renders the entire installation more economic.

LIST OF REFERENCE NUMERALS 1 upper well
2 upper well water reservoir
3 upper well level
4 lower well
5 lower well water reservoir
6 lower well level
7 water line
8 pump
9 electrical generator
10 valve
11 upper groundwater aquifer
12 lower groundwater aquifer
13 water-impermeable layer
14 intermediate water reservoir
15 intermediate water level
16 slope of groundwater pressure surface
17 water-tight jacket
18 water-tight jacket
19 sensor
20 power grid
21 line
22 submersible pump
23 valve
24 water column
25 heat exchanger
26 converter or inverter
27 energy storage
28 first branch line
29 second branch line
30 connecting line

What is claimed is:

1. A device for utilizing groundwater, characterized by:
   a) an upper well with a vertical or predominantly vertical well shaft and an upper well water reservoir having a first well water level;
   b) a lower well with a vertical or predominantly vertical well shaft and a lower well water reservoir having a second well water level;
   c) wherein the second well water level is lower than the first well water level;
   d) a water line between the upper well water reservoir and the lower well water reservoir comprising:
      a first branch line extending downwardly inside the well shaft of the upper well and into the upper well water reservoir,
      a second branch line extending downwardly inside the well shaft of the lower well and into the lower well water reservoir, and
      a connecting line extending horizontally or predominantly horizontally and connecting the first branch line and the second branch line;
   e) at least one turbine situated at the level of the connecting line and coupled to the water line for a rotary drive of a turbine rotor by the fluid in the water line; and
   f) an electrical generator comprising a rotor which is mechanically coupled to the at least one turbine rotor and a stator with one or multiple electric output terminals,
   g) wherein the one or multiple electric output terminals of the electrical generator are connected to an energy storage device or to a converter or inverter which is coupled to a power grid for delivering electric power to the power grid characterized in that the upper well and the lower well are situated concentrically with respect to one another, the lower well being annularly surrounded by the upper well and being separated from same by a ring-shaped water-tight structure.

2. The device according to claim 1, characterized in that the height difference between the upper well water level and the lower well water level is 2 m or greater, or is 5 m or greater, or is 10 m or greater, or is 20 m or greater, or is 50 m or greater.

3. The device according to claim 1, characterized in that the upper well water reservoir, the lower well water reservoir and one or more intermediate water reservoirs are situated one above the other along one or more connecting lines.

4. The device according to claim 1, characterized in that a water productivity of the upper well is less than or equal to a water absorption capacity of the lower well.

5. The device according to claim 1, characterized in that bottoms of the upper well and of the lower well are drilled to different depths above sea level.

6. The device according to claim 1, characterized in that the height difference between the bottoms of the upper well and of the lower well is 2 m or greater, or is 5 m or greater, or is 10 m or greater, or is 20 m or greater, or is 50 m or greater.

7. The device according to claim 1, characterized in that a groundwater pressure surface of the upper well is above an elevation of a groundwater pressure surface of the lower well.

8. The device according to claim 7, characterized in that the groundwater pressure surfaces at the upper well and at the lower well do not merge into one another, but instead are part of different groundwater levels.

9. The device according to claim 1, characterized in that a water-impermeable layer of soil or rock is sealed off between two different drilled groundwater levels to avoid direct overflow between various groundwater levels.

10. The device according to claim 1, characterized in that the shaft of a well that extends into a lower groundwater level is sealed off from the outside at the level of one or multiple upper groundwater levels by a water-tight jacket (18) in order to prevent the direct entry of groundwater from the one or multiple upper groundwater levels.

11. The device according to claim 1, characterized in that at least one shaft of the upper well and the lower well is jacketed, in part or over an entire height.

12. The device according to claim 1, characterized in that the cross sections of the the upper well and the lower well are different.

13. The device according to claim 1, characterized in that the cross section of the upper well is less than or equal to the cross section of the lower well.

14. The device according to claim 1, characterized in that to detect drying up of the upper well, a sensor is provided in the area of the upper well and/or in the area of the connecting line between the upper well water reservoir and the lower well water reservoir, upstream from a hydraulic motor or from a pump that is operable as a generator.

15. The device according to claim 1, characterized in that a shutoff valve is provided in the area of the connecting line between the upper well water reservoir and the lower well water reservoir in order to interrupt the flow inside the connecting line when the upper well dries up.

16. The device according to claim 1, characterized in that the connecting line between the upper well and the lower well is routed, at least in areas, above ground level.

17. The device according to claim 1, characterized in that the connecting line between the upper well and the lower well is laid entirely below ground level.

18. The device according to claim 1, characterized by a device for exchanging heat with the water in the water line, especially with the water in the connecting line, more specially between the water in the water line and a heat transfer medium.

19. The device according to claim 1, characterized in that the one or more turbines and/or the generator is/are installed below ground level, or is/are installed within a tunnel housing an underground connecting line between the upper well and the lower well.

20. A method for utilizing groundwater by means of a device comprising:
an upper well with a vertical or predominantly vertical well shaft and an upper well water reservoir having a first well water level;
a lower well with a vertical or predominantly vertical well shaft and a lower well water reservoir having a second well water level;
wherein the second well water level is lower than the first well water level;
a water line with an inner cavity extending between the upper well water reservoir and the lower well water reservoir comprising:
a first branch line extending downwardly inside the well shaft of the upper well and into the upper well water reservoir,
a second branch line extending downwardly inside the well shaft of the lower well and into the lower well water reservoir, and
a connecting line extending horizontally or predominantly horizontally and connecting the first branch line and the second branch line;
at least one turbine situated at the level of the connecting line and coupled to the water line for a rotary drive of a turbine rotor by the fluid in the water line; and
an electrical generator comprising a rotor which is mechanically coupled to the at least one turbine rotor and a stator with one or multiple electric output terminals characterized in that the upper well and the lower well are situated concentrically with respect to one another, the lower well being annularly surrounded by the upper well and being separated from same by a ring-shaped water-tight structure;
characterized by the following steps:
a) the inner cavity inside the water line is completely filled with water;
b) when one or multiple valves in the water line are open, the differential pressure between the upper well water reservoir and the lower well water reservoir in the connecting line brings about a flow from the upper well to the lower well, thus driving the turbine;
c) power is generated in the electrical generator connected to the turbine, and is stored, locally consumed, or supplied to a power grid via a converter or inverter coupled between the one or multiple output terminals of the electrical generator on the one hand and the power grid on the other hand.

21. The method according to claim 20, characterized in that for filling the connecting line, water is filled from the top into the connecting line, or is filled from one of the upper and lower wells, or is filled via a further line having a submersible pump.

22. The method according to claim 20, characterized in that during or after filling of the water line, the valves in the area of one or both of the upper and lower well water reservoirs are closed to avoid runoff of a water column from the connecting line.

23. The method according to claim 20, characterized in that in step a) the electrical generator is operated as a motor and the hydraulic motor is operated as a pump, in such a way that water is drawn into the connecting line between the upper well and the lower well completely filled with water.

24. The method according to claim 20, characterized in that in step c) the electrical generator is operated as a generator in order to deliver electrical energy.

25. A device for utilizing groundwater, characterized by:
a) an upper well with a vertical or predominantly vertical well shaft and an upper well water reservoir having a first well water level;
b) a lower well with a vertical or predominantly vertical well shaft which is sealed off from the outside at the level of upper groundwater levels by a water-tight sealing in order to prevent the direct entry of groundwater from an upper groundwater level, and a lower well water reservoir having a second well water level;

c) wherein the second well water level is lower than the first well water level;

d) a water line between the upper well water reservoir and the lower well water reservoir comprising:

a first branch line extending downwardly inside the well shaft of the upper well and into the upper well water reservoir, wherein the outer cross-section of the first branch line is smaller than the inner cross-section of the well shaft of the upper well at least by a clearance so that a water level of the upper well water reservoir outside the first branch is under atmospheric pressure, a second branch line extending downwardly inside the well shaft of the lower well and into the lower well water reservoir, wherein the outer cross-section of the second branch line is smaller than the inner cross-section of the well shaft of the lower well at least by a clearance so that a water level of the lower well water reservoir outside the second branch is under atmospheric pressure, and a connecting line extending horizontally or predominantly horizontally and connecting the first branch line and the second branch line, e) at least one turbine situated at the level of the connecting line and coupled to the water line for a rotary drive of a turbine rotor by the fluid in the water line, which transforms waterpower of the water inside of the connecting line into mechanical power; and f) an electrical generator comprising a rotor which is mechanically coupled to the at least one turbine rotor and a stator with one or multiple electric output terminals for outputting electric power generated from the mechanical power of the turbine rotor, g) wherein the one or multiple electric output terminals of the electrical generator are connected to an energy storage device or to a converter or inverter which is coupled to a power grid for delivering electric power to the power grid characterized in that the upper well and the lower well are situated concentrically with respect to one another, the lower well being annularly surrounded by the upper well and being separated from same by a ring-shaped water-tight structure.

26. The device according to claim 1, characterized in that the at least one turbine and the generator coupled thereto are integrated with each other to one single component.

27. The device according to claim 26, characterized in that the single component comprising the at least one turbine and the generator coupled thereto is a hydraulic motor or a pump, which is operable as a generator.

* * * * *